United States Patent
Yamaguchi et al.

[11] Patent Number: 5,399,303
[45] Date of Patent: Mar. 21, 1995

[54] METHOD OF CONTROLLING RESIN MOLDING CONDITIONS

[75] Inventors: Hiroshi Yamaguchi, Hirakata; Takahisa Kondou, Sanda, both of Japan

[73] Assignee: Matsushita Electric Industrial Co., Ltd., Osaka, Japan

[21] Appl. No.: 104,560

[22] Filed: Aug. 11, 1993

[30] Foreign Application Priority Data

Aug. 24, 1992 [JP] Japan .................................. 4-223762

[51] Int. Cl.$^6$ ............................................. B29C 45/56
[52] U.S. Cl. .................. 264/40.5; 264/40.6; 264/328.16; 264/2.2
[58] Field of Search ............ 264/40.1, 40.5, 40.6, 264/328.1, 328.16, 2.2, 328.7

[56] References Cited

U.S. PATENT DOCUMENTS

| | | |
|---|---|---|
| 4,836,960 | 6/1989 | Spector et al. .................. 264/2.2 |
| 4,882,117 | 11/1989 | Takeda et al. .................. 264/328.16 |
| 5,093,049 | 3/1992 | Uehara et al. .................. 264/328.16 |

*Primary Examiner*—Jill L. Heitbrink
*Attorney, Agent, or Firm*—Wenderoth, Lind & Ponack

[57] ABSTRACT

A method is provided for controlling molding conditions of resin in the manufacture of articles such as optical lenses, which includes the steps of filling resin in a metal mold held at a temperature lower than a glass transition temperature of the resin, and then pressurizing the resin under comparatively high pressure so as to expedite hardening of the resin by raising its glass transition temperature, then reducing the pressurization of the resin to comparatively low pressure, and increasing, generally in association, the temperature of the mold cavity surface higher than the glass transition temperature of the resin so as to form a molten layer on a front face of the resin surface, and finally raising the pressurization of the resin to a medium pressure and lowering, generally in association, the cavity surface temperature of the metal mold so as to reduce the temperature for the withdrawal of the product.

6 Claims, 3 Drawing Sheets

METHOD OF CONTROLLING RESIN MOLDING CONDITIONS

BACKGROUND OF THE INVENTION

1. Field of the Invention

The present invention generally relates to a resin molding technique, and more particularly, to a resin molding condition control method for controlling temperature conditions for metal molds and pressurizing conditions for the resin during resin molding. The intention is particularly applied to molded items requiring high accuracy such as plastic lenses and the like.

2. Description of Related Art

In recent years, with the spread of appliances having optical systems such as a projection type television receiver, video camera, CD player or the like, mass produced plastic lenses meet the rapidly increasing demand for these optical systems have come into actual use for wide applications and provide a cost advantage, a light weight and high aberration correcting capacity by an aspherical structure, etc.

In these plastic lenses, a particularly high accuracy in the configuration is required as compared with resin molded articles in general, and as one means for realizing such a high accuracy, there has conventionally been proposed a method for raising the temperature at the resin surface layer after the resin has been cooled down to a certain extent, for example, in Japanese Patent Publication Tokkosho No. 61-19920 or Tokkohei No. 1-34132.

In the known method described above, by making uniform, the non-uniform density distribution resulting from large differences in cooling/hardening speeds of resin from place to place, through softening on the surface layer of the resin and rearrangement of the resin by melting, uneven shrinkage or contraction (so-called shrinkage or sink mark) may be reduced to achieve high accuracy in the configuration.

According to research by the present inventors, in order to fully to obtain the effect by the temperature raising, it is necessary that the resin be almost completed in its hardening before starting the temperature raising, and also upon completion of the temperature raising, the resin be softened and melted to such an extent that the non-uniformity of the pressure distribution may be eliminated.

The temperature which satisfies the above conditions may be determined by the temperature dependency of viscoelastic characteristics of the resin to be employed, and although there may be some differences depending on resins to be dealt with, it is estimated that the above temperature is a temperature approximately equal to the glass transition temperature for the former condition, and a temperature higher than the glass transition temperature by about 10° to 60° degrees C. with respect to the latter condition.

It is noted, however, that the glass transition temperature has a pressure dependency, and becomes higher as the pressure is raised.

Meanwhile, the completion of the transfer of the resin configuration is at a time point when the resin has finished its phase change from a liquid phase to a solid phase, i.e., at a time point when the resin has reached the glass transition temperature, and it is considered that a ratio of a specific volume at this time (glass transition specific volume) to a specific volume under normal temperature and normal pressure, may be concluded as the molding shrinkage factor. However, it should be noted that the resin has a large compressibility, and the glass transition specific volume and consequently, the molding shrinkage factor is varied to a large extent by an applied pressure.

Since the physical properties of resin (e.g., viscoelastic characteristics, specific volume) strongly depend on the pressure, the pressure condition control is important as well as the temperature condition control in the precision molding. Moreover due to the fact that they are not independent requirements, but mutually related, it becomes necessary to provide a molding condition control for coordinating the control of the temperature conditions and pressure conditions.

In the conventional techniques, however, there have been effected no coordinated and rational molding condition control from the viewpoints of both the temperature and pressure dependency in the physical properties of resin, especially, taking into consideration the mutual interrelationship between these properties.

SUMMARY OF THE INVENTION

Accordingly, an essential object of the present invention is to provide a method of controlling molding conditions of resin, which realizes molding at high accuracy by a cycle time at the necessary minimum, by taking into consideration, the temperature and pressure dependencies of the viscoelastic characteristics of resin.

Another object of the present invention is to provide a method of controlling molding conditions to which is simple in steps, and can be readily incorporated into a production line at low cost.

In accomplishing these and other objects, according to one preferred embodiment of the present invention, there is provided a method of controlling molding conditions of resin, which includes the steps of filling resin in a metal mold held at a temperature lower than a glass transition temperature of said resin under normal pressure by 5° to 20° degrees C., and thereafter pressurizing the resin under comparatively high pressure in the range of 600 to 1400 kgf/cm$^2$, thereby to expedite hardening of the resin by raising the glass transition temperature thereof and also, reduce a value of a specific volume of the resin to a small value close to the specific volume under room temperature and atmospheric pressure. Then reducing the pressurization of the resin to comparatively low pressure in the range of 30 to 200 kgf/cm$^2$ at a time point when the entire region of the resin has been cooled down near the glass transition temperature at said pressurized state so as to lower the glass transition temperature of the resin, and starting to raise, generally in association therewith, a cavity surface temperature of the metal mold to a temperature higher than the glass transition temperature under said comparatively low pressure by 10° to 60° degrees C., thereby to soften and melt the resin from its surface layer. Following this point further increasing the temperature generally on the entire region of the cavity surface higher than the glass transition temperature at the comparatively low pressure by 10° to 60° degrees C., thereby to form a molten layer on a front face of the resin surface, lowering the pressurization of the resin to comparatively medium pressure at 200 to 600 kgf/cm$^2$ at a time point when release of the pressure distribution has been completed so as to reduce the value of the specific volume in the vicinity of the glass transition temperature to a value close to that of the specific volume at room temperature and atmospheric pressure, and starting to lower, generally in association therewith, the cavity surface temperature of the metal mold thereby to reduce the temperature at the withdrawal of a product to be lower than the glass transition temperature at normal temperature by 5° to 20° degrees C.

By employing the molding condition control method according to the present invention as described above, it is possible to rapidly achieve the hardened state necessary for introducing subsequent temperature raising step by applying a high pressure in the cooling step at the early stage, thereby increasing the glass transition temperature of the resin. Moreover, by reducing the applied pressure at the temperature raising step, the glass transition temperature of the resin is lowered so as to obtain the desired temperature raising effect at the comparatively low temperature, and further, by applying the comparatively medium pressure at the temperature lowering step subsequent thereto, comparatively small molding shrinkage factor may be realized by the small residual stress. Consequently, the high accuracy in configuration one of the molded article may be achieved in the necessary minimum molding time.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
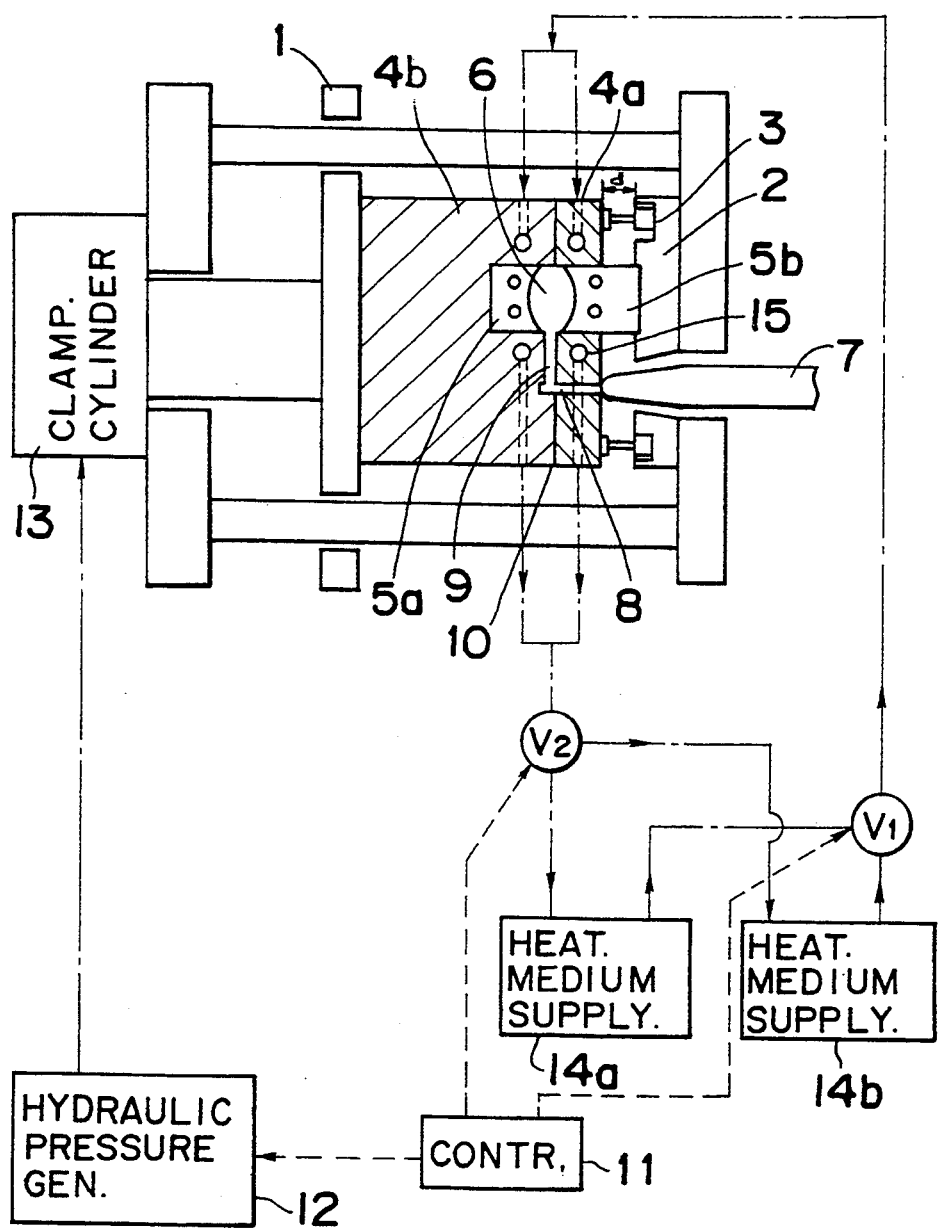
FIG. 1 is a schematic block diagram showing construction of a resin molding condition control apparatus for practicing the a method of controlling molding conditions of resin according to the present invention.

Before the description of the present invention proceeds, it is to be noted that like parts are designated by like reference numerals throughout the accompanying drawings.

Referring now to the drawings, there is shown in FIG. 1, a resin molding condition control apparatus for effecting a resin molding condition control method according to one referred embodiment of the present invention.

It is noted here that specific values of temperatures and pressures referred to in the embodiment given hereinafter are based on resins and acrylic materials employed therefor.

The resin molding condition control apparatus as shown in FIG. 1 is so arranged that a movable side plate 1 of the apparatus is restricted by a retreat restricting mechanism (not shown) so as to form a clearance d between a stationary side template 2 and a stationary side metal mold 4a, while an inner mold cylinder 3 is actuated to inject resin from an injection nozzle 7 in a state where a parting face 10 is closed, thereby to introduce the resin into a cavity 6 defined by the stationary side metal mold 4a, a movable side metal mold 4b, a stationary side nest 5a, and a movable side nest 5b through a sprue 8 and a runner 9.

After effecting gate sealing upon completion of a filling step such as the injection and pressure dwelling, hydraulic pressure adjusted by a signal from a controller 11 is supplied from a hydraulic pressure generating device 12 to actuate a clamping cylinder 13 for generating a mold clamping force. In this case, since the stationary side metal mold 4a and the stationary side nest 5a are arranged to be movable, with the clearance d formed between the stationary side template 2 and the stationary side metal mold 4a, the resin within the cavity 6 may be varied in its volume, and thus, pressure corresponding to the clamping force can be effectively applied to the resin in the cavity 6, and it becomes possible to apply to the resin, pressures as desired including a first pressure comparatively low in the range of 30 to 200 kgf/cm$^2$, a second pressure of a comparatively medium degree in the range of 200 to 600 kgf/cm$^2$, and a third pressure comparatively high in the range of 600 to 1400 kgf/cm$^2$ according to a preset pattern.

Moreover, by operating direction control valves V1 and V2 based on signals from the controller 11, thereby to selectively feed a heating medium at 90° supplied from a heating medium supply device 14a and a heating medium at 150° C. supplied from a heating medium supply device 14b, into heating medium passages 15 provided in the metal mold and nest, it becomes possible to adjust the cavity surface temperature of the metal mold in the range from 90° C. which is lower by 15° C. than a glass transition temperature at 105° of acrylic resin under normal pressure, to 150° which is higher by 45° C. than said glass transition temperature 105° C.

Figure 2A:
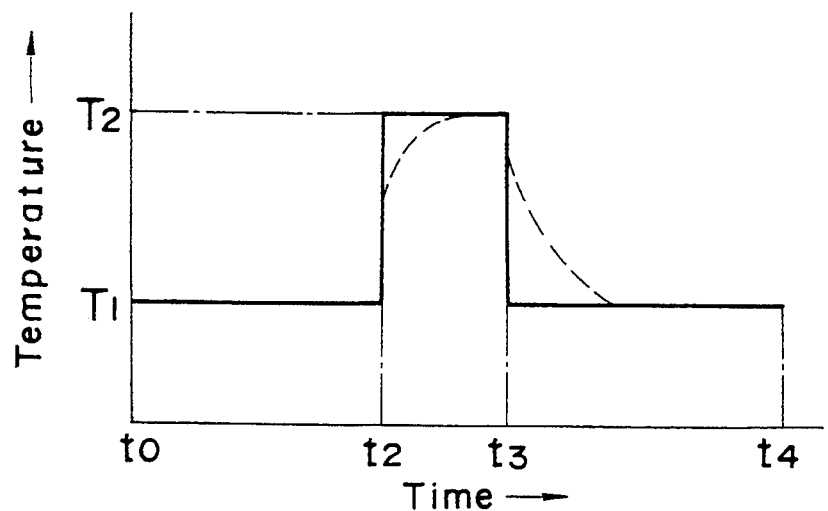
FIG. 2(a) is a graphical diagram of a temperature control pattern for explaining the molding condition control method by the control apparatus of FIG. 1.
Figure 2B:
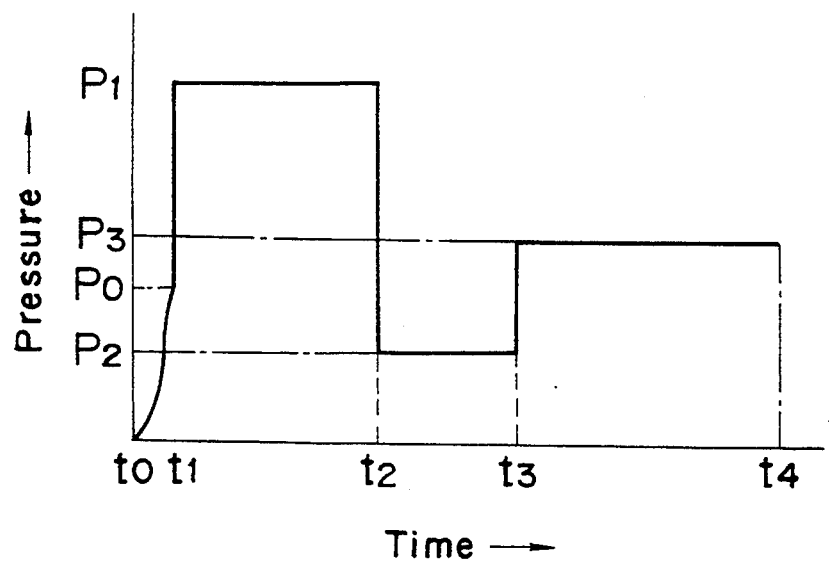
FIG. 2(b) is also a graphical diagram of a pressure control pattern for explaining the molding condition control method by the control apparatus of FIG. 1.
Figure 3:
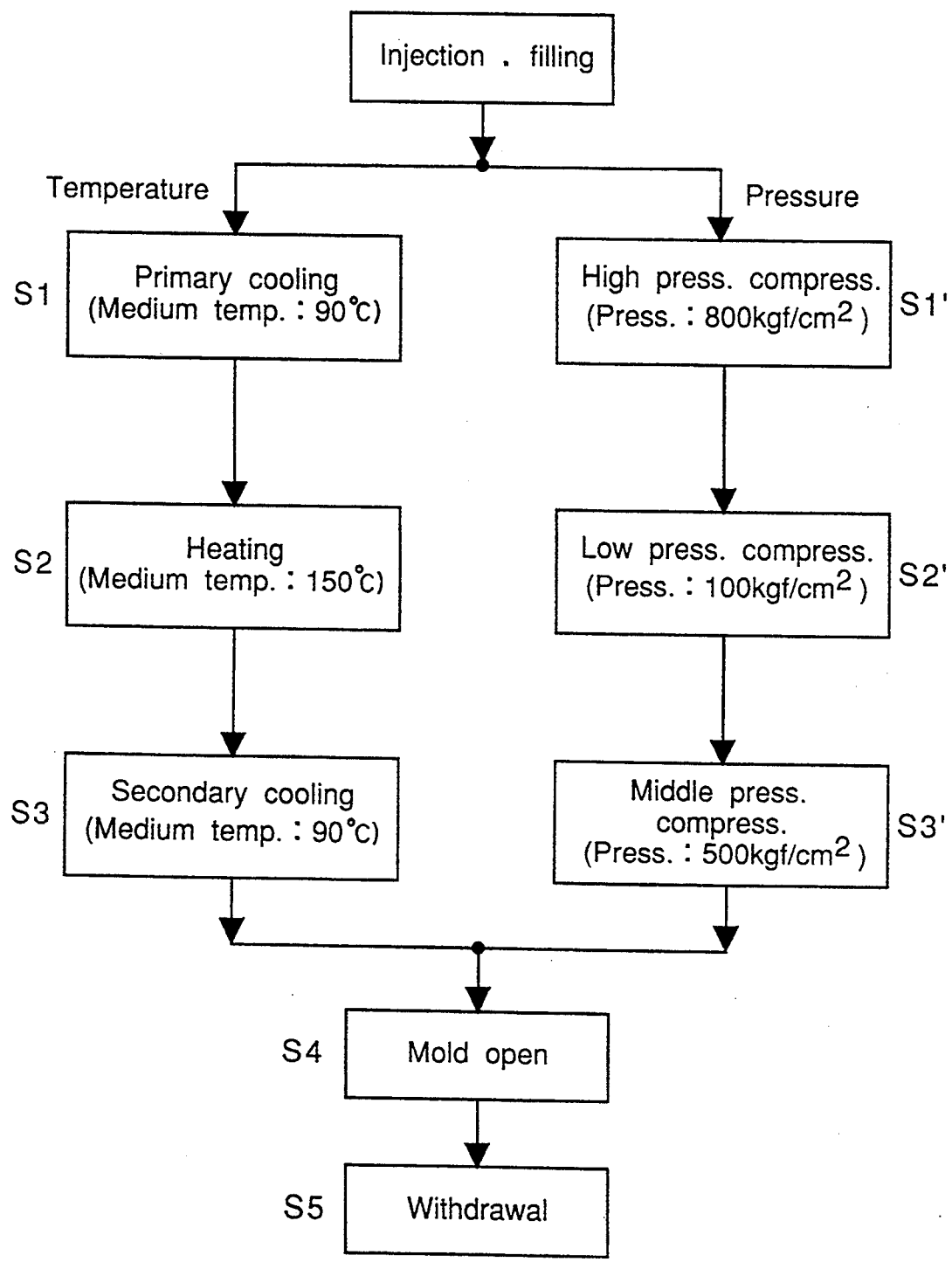
FIG. 3 is a flow-chart for explaining steps for the molding condition control method according to the present invention.

FIGS. 2(a) and 2(b) are graphical diagrams showing a temperature control pattern and a pressure control pattern according to one preferred embodiment of the present invention in which the resin molding condition control method of the present invention is applied to an acrylic resin, and which may be realized by employing the resin molding condition control apparatus referred to earlier with reference to FIG. 1. Meanwhile, FIG. 3 shows a flow-chart for explaining steps for the resin molding condition control method according to the present invention.

In FIGS. 2(a) and 2(b), the abscissa represents time which relates to a molding process, with an injection starting time point set as t0, and in FIG. 2(a), the ordinate denotes temperature, while heating medium temperature for the temperature adjustment is shown by a solid line, and cavity surface temperature of a metal mold is denoted by a dotted line. The ordinate in FIG. 2(b) represents pressure to be applied to the resin.

Referring to FIGS. 2(a) and 2(b), and also to the flow-chart of FIG. 3, the resin molding condition control method according to the present invention will be explained hereinbelow.

In the first place, at the injection starting time t0, the movable side plate 1 of the molding apparatus in FIG. 1 is restricted by the retreat restricting mechanism (not shown), thereby to form the clearance d between the stationary side template 2 and the stationary side metal mold 4a, while the inner-mold cylinder 3 is operated to close the parting face 10, and the heating medium at a temperature T1 of 90° C. is continuously introduced into the metal mold from an end stage of the previous cycle so as to maintain the temperature at T1 (Step S1). This is realized by forming a closed loop including the temperature controller 14a, the heating medium passages, and the valves V1 and V2 by operating the controller direction control valves V1 and V2 in the molding condition control apparatus of FIG. 1.

In the above state, the resin is injected from the injection nozzle and introduced into the cavity 6. In the filling process such as the injection and pressure dwelling, no forced compression by the clamping cylinder is effected, and the resin pressure is applied by the injection device as a source. Since the cavity volume has been preliminarily enlarged by an amount to cope with the clearance d, no particularly large pressure is required for filling a proper amount of the resin, and the filling is effected under a comparatively low pressure P0 at about 200 kfg/cm$^2$.

At the time t1 after completion of the filling, the gate sealing is effected, while the signal is transmitted to the hydraulic pressure generating device 12 by the controller 11 so as to actuate the clamping cylinder 13 and compress the resin under a pressure of 800 kgf/cm$^2$ (Step S1').

By applying such a high pressure as above, the glass transition temperature of the acrylic resin is shifted from 105° at the normal pressure to about 130° for acceleration of hardening, and thus, the entire region of the resin is brought into a generally hardened state at an earlier stage. It is to be noted, however, that in this state, large non-uniformity in the stress is produced due to significant difference in the cooling history according to portions of the resin, and if the resin is taken out as it is, uneven shrinkage will be formed to produce the so-called sinkage or sink mark.

At a time point t2 when the entire region of the resin is regarded to be generally in the hardened state, the direction control valves V1 and V2 are operated so as to change over the heating medium to be introduced into the heating medium passages 15 of the metal mold, from the heating medium at the temperature T1 of 90° C. supplied from the heating medium generating device 14a, to the heating medium at the temperature T2 of 150° C. (Step S2) fed from the heating medium generating device 14b, thereby to start the temperature raising on the cavity surface, while, by the procedure as. described earlier, the pressure to be applied to the resin is reduced to 100 kgf/cm$^2$ (Step S2').

As described above, by lowering the glass transition temperature of the acrylic resin to a value close the 105° C. under the normal pressure through application of a low pressure, the entire region on the resin surface layer may be softened and melted at an earlier stage. At the time point when the entire region on the resin surface layer has been softened and melted, uniform pressure is applied based on Pascal's principle, and makes uniform, the uneven stress which may give rise to sinkage as referred to earlier.

At a time point t3 when the entire region on the surface layer of the resin is regarded to have been softened and melted, the heating medium to be introduced into the heating medium passage 15 of the metal mold is again changed over to the heating medium at the temperature T1 of 90° C. to be fed from the heating medium generating device 14a so as to start lowering of the temperature (Step S3) on the surface of the cavity, and the pressure to be applied to the resin is set to 500 kgf/cm$^2$ (Step S3').

The configuration is fixed when the resin has been again cooled to a temperature in the vicinity of the glass transition temperature and the molding shrinkage factor is determined based on a ratio of a specific volume at this time to a specific volume under normal temperature and pressure. Upon consideration of temperature and pressure dependencies of the viscoelastic characteristics and specific volume in the acrylic resin, the shrinkage factor becomes approximately zero under pressurization at 500 to 600 kgf/cm$^2$, and thus, the product configuration faithful to the mold shape may be expected. Meanwhile, if the pressure is excessively large, a large internal stress is produced, which may result in the loss of uniformity and isotropy in the physical properties of the resin, and become a main factor for after-deformation. Therefore, such excessively large pressure should be particularly avoided in the precision molding.

At a time point t4 at which the configuration of the resin is regarded to have been stabilized, with the entire region of the resin reaching a temperature lower than the glass transition temperature at 105° C. by 5° to 10° degrees C. under normal pressure, the metal mold is opened (Step S4) to take out the product (Step S5), and thereafter, the metal mold is again closed for shifting to a subsequent cycle.

When the resin molding condition control method and the molding apparatus for effecting the control method according to the present invention as described so far are employed, it becomes possible to effect proper control of temperature and pressure based on the physical properties of the resin in the respective steps from the initial cooling to temperature raising and lowering.

It is to be noted here that, in the present embodiment as applied to the acrylic resin, although the first heating medium temperature T1 is set at 90° C., when the stabilization of the configuration after withdrawal of the product is taken into account for setting a lower limit value of the temperature of the resin during taking out, it is possible to set the glass transition temperature at the normal pressure as an upper limit. However, if the temperature is too low, the uniformity in the vicinity of the glass transition temperature is lost for deterioration of the configurational accuracy, while the molding time becomes longer if a high temperature close to the glass transition temperature is used, and therefore, it is proper to adopt the temperatures in the range of 85° to 100° C., which are lower than the glass transition temperature by 5° to 20° degrees C.

Meanwhile, in the above embodiment, although the second heating medium temperature T2 was set at 150° C., it is possible to set the glass transition temperature at the applied pressure in the temperature raising process as the lower limit. However, if the temperature is set very close to the lower limit temperature, a longer time is required for softening the entire region on the resin surface layer, while, on the contrary, if the temperature is too high, over-temperature raising may result, thus requiring a long time in the subsequent temperature lowering step, with reduction in the uniformity during re-hardening for spoiling of the configuration. Therefore, it is proper that the temperature is set at a temperature higher than the glass transition temperature under the applied pressure (approximately 110° C. at 100 kgf/cm$^2$ of the present embodiment) by 10° to 60° degrees C. (i.e., 120° to 180° C. in the similar condition).

Moreover, according to the present embodiment, although the heating medium has been employed for the temperature raising and lowering, the concept of the present invention is not limited, in its application, to such heating medium, but an electric heater, and induction heating device, etc. may be employed as a temperature raising means.

It should also be noted here that the necessary temperatures referred to in the above embodiment relate to the case where acrylic resin is employed as the resin, and needless to say, the values differ therefrom when different resins are employed, and the proper range having the glass transfer temperature as the starting point may be slightly different according to the state of the curve of the viscoelastic characteristics in the vicinity of the glass transition temperature. According to the investigation by the present inventors, however, the difference in the proper range as described above is small as compared with the difference in the absolute values of the glass transition temperature, and with respect to the resin in the range as studied, the values are applicable within the range as described earlier.

With respect to the pressure to be applied to the resin, although the first pressure P1 is set at 800 kgf/cm$^2$ in the first place, this value may be determined by setting about 600 kgf/cm$^2$ as the lower limit for the purpose of expediting hardening by raising glass transition temperature. However, if the pressure is too high, since the internal strain which may not be eliminated by the subsequent temperature rasing is produced, and a problem related to the construction and design of the metal molds (strength and deformation) will be brought about, the pressure should preferably be below about 1400 kgf/cm$^2$.

Similarly, although the second pressure P2 is set at 100 kgf/cm$^2$ this may be determined by setting the upper limit at about 200 kgf/cm$^2$ for the purpose of preventing the rising of the glass transition temperature by the pressurization, and also reducing the raised temperature required for softening and melting the resin, or shortening the time required for the temperature rise. However, the setting should preferably be above about 30 kgf/cm$^2$, since the shaping of the metal mold configuration can not be sufficiently effected, if the pressure is too low.

The reason for setting the third pressure P3 at 500 kgf/cm$^2$ is such that the specific volume of the acrylic resin in the vicinity of the glass transition temperature becomes generally equal to the specific volume in the normal temperature and pressure, under the above pressure, and the molding shrinkage factor becomes almost zero. Since the residual stress tends to be larger as said pressure becomes high, about 600 kgf/cm$^2$ should preferably be set as the upper limit, and particularly, in such a case as in the application to optical lenses for which uniformity and isotropy are strongly demanded, there may be considered, for example, such a practice that the pressure P3 should be suppressed to about 300 kgf/cm$^2$, and the molding shrinkage which may occur is preliminarily taken into account in the configuration of the metal mold.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of controlling molding conditions of resin, which comprises the steps of:
   (a) filling resin in a mold held at a temperature lower than a glass transition temperature of the resin under an initial pressure,
   (b) thereafter pressurizing the resin under an increased pressure to substantially harden the resin,
   (c) subsequently reducing the pressurization of the resin to a pressure below the initial pressure at a time point when the entire region of the resin has been cooled down near the glass transition temperature of the resin at the increased pressure, and starting to raise, substantially in association therewith, a cavity surface temperature of the mold to a temperature higher than the glass transition temperature of the resin under the reduced pressure, to remelt a surface of the hardened resin,
   (d) and then increasing the pressurization of the resin to a pressure between the initial and increased pressure at a time point when substantially the entire region of the cavity surface has been raised to the temperature higher than the glass transition temperature of the resin at the reduced pressure to complete the temperature raising step, and starting to lower, substantially in association therewith, the cavity surface temperature of the mold down to a temperature lower than the glass transition temperature of the resin at the initial pressure, to reharden the resin.

2. The method according to claim 1, further comprising a step of removing the rehardened resin from the mold to obtain a molded resin product.

3. The method according to claim 1, wherein the molded resin product is an optical lens.

4. A method of controlling molding conditions of resin, which comprises the steps of:
   (a) filling resin in a metal mold held at a temperature lower than a glass transition temperature of the resin under normal pressure by 5° to 20° C.,
   (b) thereafter pressurizing the resin under a high pressure in the range of 600 to 1400 kgf/cm$^2$ to substantially harden the resin,
   (c) subsequently reducing the pressurization of the resin to a low pressure in the range of 30 to 200 kgf/cm$^2$ at a time point when the entire region of the resin has been cooled down near the glass transition temperature of the resin at the high pressure, and starting to raise, substantially in association therewith, a cavity surface temperature of the metal mold to a temperature higher than the glass transition temperature of the resin under the low pressure by 10° to 60° C., to remelt a surface of the hardened resin,
   (d) and then increasing the pressurization of the resin to a medium pressure in the range of 200 to 600 kgf/cm$^2$ at a time point when substantially the entire region of the cavity surface has been raised to the temperature higher than the glass transition temperature of the resin at the low pressure by 10° to 60° C. to complete the temperature raising step, and starting to lower, substantially in association therewith, the cavity surface temperature of the metal mold down to a temperature lower than the glass transition temperature of the resin at the normal pressure by 5° to 20° C., to reharden the resin.

5. The method according to claim 4, further comprising a step of removing the rehardened resin from the metal mold to obtain a molded resin product.

6. The method according to claim 4, wherein the molded resin product is an optical lens.

* * * * *